United States Patent [19]

Garrett et al.

[11] 4,104,037

[45] Aug. 1, 1978

[54] GASEOUS DIFFUSION SYSTEM

[75] Inventors: George A. Garrett, Oak Ridge, Tenn.; John Shacter, Stamford, Conn.

[73] Assignee: The United States of America as represented by the United States Department of Energy, Washington, D.C.

[21] Appl. No.: 685,762

[22] Filed: Sep. 23, 1957

[51] Int. Cl.² .............................................. B01D 59/10
[52] U.S. Cl. ........................................ 55/16; 55/158
[58] Field of Search ............................ 183/2, 2.2, 115; 23/10.5; 55/16, 158

[56] References Cited

U.S. PATENT DOCUMENTS 3,208,197  9/1965  Simon et al. ............................ 55/16

Primary Examiner—Stephen J. Lechert, Jr.
Attorney, Agent, or Firm—Dean E. Carlson; Stephen D. Hamel

EXEMPLARY CLAIM

1. A gaseous diffusion system comprising a plurality of diffusers connected in cascade to form a series of stages, each of said diffusers having a porous partition dividing it into a high pressure chamber and a low pressure chamber, and means for combining a portion of the enriched gas from a succeeding stage with a portion of the enriched gas from the low pressure chamber of each stage and feeding it into one extremity of the high pressure chamber thereof.

9 Claims, 3 Drawing Figures

U.S. Patent   Aug. 1, 1978   4,104,037
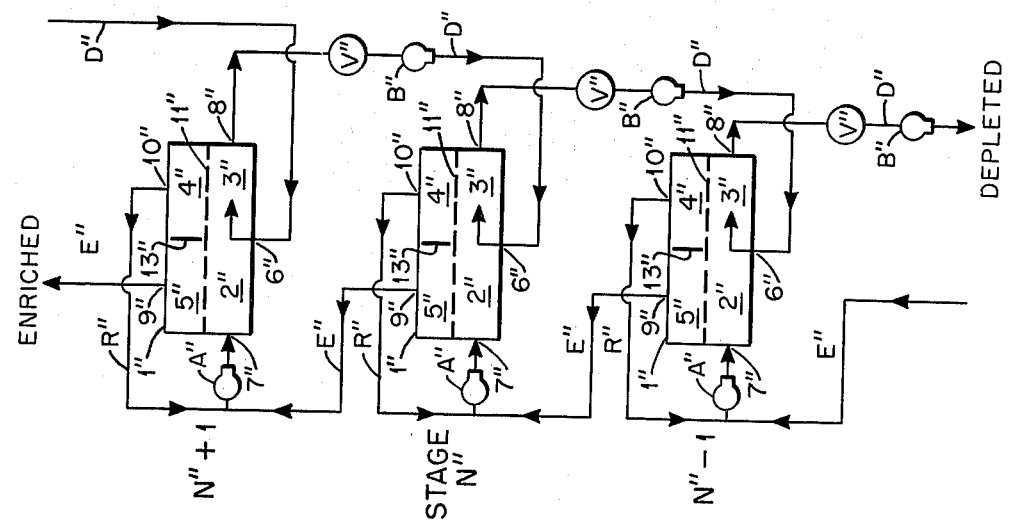
Fig. 3.
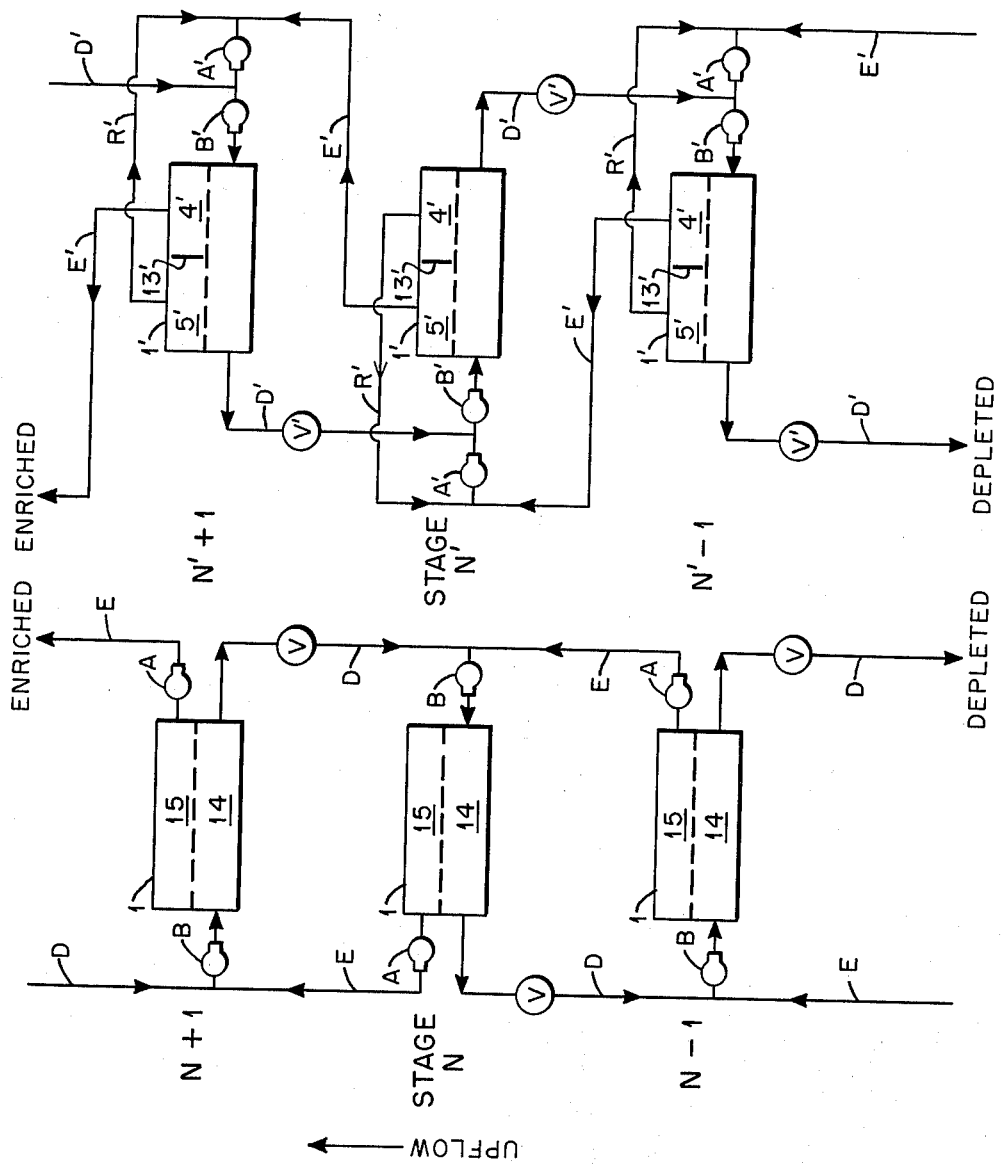
Fig. 2.
Fig. 1.

GASEOUS DIFFUSION SYSTEM

This invention relates to the selective stage-wise separation of fluids such as gases having molecules of different mass, and more particularly to an improved gaseous effusion or diffusion system for the progressive enrichment of a desired substance or component of a mixture or isotope of an element in the gaseous phase.

It is well known from Graham's law that the rate of diffusion of a gas through a porous membrane or other porous solid is inversely proportional to the square root of the density of the gas. Since the molecules of a light gas move, on the average, with a higher speed than do those of a heavier gas, components of different molecular weight in a gaseous mixture have different rates of diffusion through a porous solid and this can be used for their separation. Thus a partial separation across the porous solid of the uranium isotopes, U-235 and U-238, may be effected in the gaseous phase, since the relative velocity of diffusion through small openings in the membrane, generally referred to as the barrier, will be greater for the lighter isotope-gas U-235 $F_6$ than for the heavier isotope-gas U-238 $F_6$, as the mixture passes through the membrane.

However, the maximum theoretical separation, as indicated by application of Graham's law, is not obtainable. In practice, a change in the ratio of the pressure of the effused or diffused gas, which may be termed the "back pressure" to the effused gas, which may be termed the "fore" pressure, may alter the separation. Another factor effecting separation is the separation quality of the porous solid, such as homogeneity, the ratio of the radius of the barrier pores to the mean-free path of the gas molecules, etc. From the above, it is seen that there will be a change in the "theoretical point separation factor" $\alpha$, as represented by the following equation:

$$\alpha = \frac{\frac{U\text{-}235\ F_6}{U\text{-}238\ F_6}\ \text{(effused)}}{\frac{U\text{-}235\ F_6}{U\text{-}238 F_6}\ \text{(non-effused)}}.$$

Other factors, such as the tendency of the gas layers adjacent to the barrier to be somewhat different in gas composition from the main bodies of gases due to the lack of proper mixing, and the property of present actual porous solid or barrier to cause also gas flow other than by molecular effusion so that some of the flow is non-separating, also affect the separation which is attainable.

Due to the small difference in the molecular weights of these two isotopes, and the other factors considered above, it can be seen that the separation or enrichment of the lighter isotope, achieved in passing through a single barrier, is very small. Therefore, it is necessary, in order to effect the desired concentration, to pass the gaseous mixture through a series of successive barriers, which progressively contribute to the enrichment of the lighter isotope. This can be accomplished by associating many diffusion stages in series to form a cascade. Each stage may include a diffuser or converter housing a diffusion barrier for the separation of the components of the gas fed thereto, together with the necessary compressors (and motors) for creating pressure differentials and adjusting differences in pressure head, a cooler to remove heat of compression, and a control valve for regulating the flow rates of the gases. The barrier may take the form of a flat or corrugated porous plate or series of plates, a series of tubes having porous walls for the passage of gases from the insides of the tubes outwardly, or vice-versa, or it may take any other suitable form. The material which enters the diffuser or converter is divided into two fractions, one of which passes through the barrier. That fraction of the feed flow which passes through the barrier is termed the "cut." The "cut" of a barrier is designated by the Greek letter $\theta$ and is represented by the following equation:

$$\theta = \frac{\text{molar flow of effused stream (enriched in } U\text{-}235\ F_6)}{\text{molar flow of feed or input stream}}$$

The separation achieved by a stage is designated by the Greek letter $\psi$ which is defined by the following equation:

$$\psi = \frac{Y - X}{X(1 - Y)}.$$

In the above equation, $X$ is the mole fraction of light component in the non-effused exit stream, and $Y$ is the mole fraction of light component in the effused stream. The definition of $\psi$ resembles that of $(\alpha - 1)$, but differs in that it is based on the overall separation of the stage, while that of $(\alpha - 1)$ is based on the point performance of the barrier herein.

In one simple form of gaseous diffusion system, a group of diffusers or converters, each including a barrier dividing it into a high-pressure chamber and a low-pressure chamber, are series-connected to form a cascade. The gaseous diffusion mixture, as it is fed into one extremity of the high-pressure chamber of each converter, travels along the barrier and towards the exit or other end of the converter, and diffuses through the barrier into the low-pressure chamber. It will be apparent that as the gas flows along the high-pressure side of the barrier, the concentration of the lighter component in the gas on the high-pressure side and in the gas passing through the barrier, progressively decreases. Thus, the portion of the feed which initially contacts the barrier, yields a more highly enriched effused gas fraction than that portion which has final contact with it near the exit of the converter. The impoverished or depleted portion of gas is removed at the exit extremity of every high-pressure (non-effused gas) chamber and goes to the next lower stage entrance where it is combined with other gases to form the feed for such lower stage. Then the enriched portion of the gases from every lower-pressure (effused gas) chamber are mixed with other gases and provide the feed for the next higher stage. Thus, the feed for each stage is comprised of a combination of non-effused, depleted or impoverished gases from the next higher stage, and the effused, enriched gases from the next lower stage. These gas streams are mixed and brought to the proper pressure level prior to being fed to such stage. This simple arrangement is known as the "badger" stage. It entails the use of one converter for each stage, involves no intra-stage recycling, and its efficiency as a diffuser is limited. There are other objectionable features in this arrangement, i.e., two different sources of energy, in the form of two different compressors or two different barrels of one double-suction axial compressor and one valve are used for each stage and converter, and appreciable power losses result from the many valves and from the considerable stage piping required in a cascade of this type.

In another type of stage, referred to as the "rabbit" stage, the low pressure section of the diffuser or converter is compartmentalized by partition or otherwise to form two low-pressure chambers, so that the first chamber, located near the feed inlet of the diffuser or converter, will receive the first and, consequently, the most enriched fraction of the gas diffusing through the barrier. The typical "rabbit" stage involves intra-stage recycling, so that the feed is a combination of the depleted portion from the next higher stage, the most enriched fraction from the first low-pressure chamber of the next lower stage, and the less enriched fraction recycled back from the second low-pressure compartment of the converter being fed. Thus, the diffuser or converter has a single inlet and three outlets, and the "rabbiting" principle involves the separation of the diffused gas into two fractions, the lesser enriched of which is recycled to the input of the stage. This gives the effect of a "high-cut" stage, thereby achieving an increase in separating efficiency, and a reduction in the required number of stages and compressors, as compared to equivalent stages of the non-intra-stage recycle type. These advantages, however, are obtained at the expense of more complex and larger equipment. Also, the "rabbit" stages cannot be combined into an efficient cascade as well as "badger" stages, since three streams are mixed and the concentrations cannot be matched. These mixing losses lead to energy (power) losses and greater requirements of barrier area, gas holdup (inventory) and pumping, and these disadvantages counterbalance the advantages of this arrangement in many applications.

Applicants with a knowledge of these problems of prior art have for an object of their invention the provision of a stage for a gaseous diffusion system which incorporates the higher efficiencies of intra-stage recycling while avoiding energy losses arising from the mixing of streams of different enrichments.

Applicants have, as another object of their invention, the provision of a cascade employing our improved gaseous diffusion stage wherein only streams of like isotopic content are joined.

Applicants have, as another object of their invention, the provision of a gaseous diffusion system of stages employing intra-stage recycling so as to permit the use of smaller diffusers and effect economy of barrier area over that of the above-mentioned "rabbit" recycle stage.

Applicants have, as another object of their invention, the provision of a gaseous diffusion system with stages connected to provide intra-stage recycling and which may employ greatly reduced flow rates for the same separation.

Applicants have, as a further object of their invention, the provision of a gaseous diffusion system including a cascade of stages for reduction of energy losses in the stage valves through the use of reduced flow rates and without sacrifice to process control and to the selective separation of the components of the gaseous mixture fed to the system.

Applicants have, as a further object of their invention, the provision of a gaseous diffusion system including a cascade of stages for the reduction of pumping and the corresponding reduction of the loss in the stage valves.

Applicants have, as a still further object of their invention, the provision of a gaseous diffusion system wherein the stages are cascaded in such a manner as to reduce the number of compressors together with their driving motors and other electrical equipment.

Applicants have, as a still further object of their invention, the provision of a gaseous diffusion system wherein the stages are cascaded in such a manner as to reduce the number of valves and associated automatic instrumentation together with the operator effort in controlling the system during operation.

Applicants have, as a still further object of their invention, the provision of an improved gaseous diffusion system employing intra-stage recycling with converters having low pressure chambers.

Other objects and advantages of our invention will appear from the following specification and accompanying drawings, and the novel features thereof will be particularly pointed out in the annexed claims.

In the drawings,

FIG. 1 is a schematic of the conventional "badger" type gaseous diffusion stage connected in series with other stages to form a cascade.

FIG. 2 is a schematic of the "rabbit" type gaseous diffusion stage connected with other like stages to form a cascade.

FIG. 3 is a schematic of my improved gaseous diffusion stage incorporating intra-stage recycling connected with other like stages into a cascade.

Referring to the drawings in detail, 1 designates the conventional diffuser or converter which is shown schematically. It may be of any suitable type. The diffuser or converter is divided by a porous membrane or barrier into a high pressure chamber 14 and a low pressure chamber 15. This converter is connected to pumps A and B, which provide the necessary compression to adjust streams of different pressure so that they may be joined at the same pressure, and to provide the necessary pressure differentials to insure proper flow. Valves V are also provided to adjust flow and limit the effects of transients or surges by preventing them from being transmitted into other stages in the cascade, since this might tend to upset the equilibrium of the system. For convenience, the usual coolers have been omitted, since they simply serve to maintain optimum operating temperatures during use, and compensate for the heat of compression of the gases as a result of the action of the compressors. In the "badger" type stage of FIG. 1, the gas input to a typical stage comprises the depleted output of line D of the next higher stage $N+1$ and the enriched output of line E of lower stage $N-1$. No intra-stage recycling of gas is employed, and, as shown, the diffuser or converter 1 has a single inlet and two outlets.

Now referring to FIG. 2, in the diffuser or converter 1', the low pressure section is divided into two low pressure chambers 4' and 5' by a partition element 13' or otherwise, to permit separate withdrawal of the more enriched, and the lesser enriched fractions of the gas diffusing through the barrier. Compressors A' and B' adjust the differences in pressure before combining the outputs of the low pressure chambers of the two lower stages with the depleted stream from a higher stage. The valves in the depleted supply lines D' are shown at V', and, as in the previous schematic, the coolers have been omitted. The output to a typical "rabbit" type stage N' comprises the enriched fraction of line E' from lower stage $N'-1$, the depleted output of line D' from the higher stage $N'+1$, and a less enriched fraction of line R' of its own enriched gas output. As shown, the "rabbit" diffuser has a single inlet and three outlets. Since the streams of lines D', E' and R' are not all of the same enrichment, it will be seen that mixing them together to provide the feed for the stage will result in mixing losses and tend to overcome some of the good results which flowed from intra-stage recycling.

Referring now to FIG. 3, wherein applicants' improved gaseous diffusion stage is schematically shown, such stage is referred to as the "jack rabbit" stage and incorporates the advantages of the enriched intra-stage recycling, which avoids the mixing losses inherent in the "rabbit" stage of FIG. 2 by joining streams of like enrichment.

In this arrangement, the diffuser 1" is divided into a high-pressure chamber 2", 3" and two low-pressure chambers 4" and 5". As shown the sections 2" and 3" of the high-pressure chamber are connected in series and separated from the low-pressure chambers 4" and 5" by a porous diffusion barrier 11". This barrier may be of any suitable type. The chambers 4" and 5" are isolated from each other to prevent the mixing of gases collected therein. As shown, an inlet 7" is provided for the section 2" and an outlet 8" is provided for the section 3". Gas outlets 9" and 10" are provided for the low-pressure chambers 4" and 5", respectively, and an additional inlet 6" is provided at an intermediate point of the high-pressure chamber 2", 3". The feed for the high-pressure chamber of the diffuser or converter 1" of stage N" enters section 2" of the high-pressure chamber through the inlet 7" and is comprised of a mixture of streams from the low-pressure chamber 4" of stage N" through line R" and from the low-pressure chamber 5" of line E" of the next lower stage N"−1. Compressor A" serves to mix the pressure feed to the desired level. The depleted portion of the feed gas from the outlet 8" of section 3" of the high pressure chamber is recycled back to the intermediate inlet 6" of the diffuser 1" of the next lower stage N"−1, while the inlet 6" of the diffuser 1" of the stage N" receives those fed from the depleted portion of the feed of the next higher stage N"+1. Compressor B" is provided in the feed lines D" to adjust the pressure to conform with that of the feed gases flowing through sections 2" and 3" of the diffuser from the inlet 7". Valves V" are also provided in the lines D" to adjust the flow, while the conventional coolers which are employed to cool the gases in order to maintain the proper operating temperatures, have, for convenience, been omitted.

In a normal operation of a typical "jack rabbit" stage N", gas compressed by a compressor A" is circulated through sections 2" and 3", respectively, of the high-pressure chamber. A fraction of the gas circulating through the section 2" diffuses into the low-pressure chamber 5". The undiffused gas from section 2" enters the section 3", where it is combined at the inlet 6" with the depleted output of a higher stage N"+1; a fraction of this combined flow diffuses into the low-pressure chamber 4". The more enriched of the two diffused gases, i.e., that fraction which diffuses first and is collected in the chamber 5" is circulated to the input of a higher stage N"+1, as shown. The less enriched fraction R" of diffused gas is combined with the enriched upflow of line E" from a lower stage N"−1 and is recycled to the input 7" of the stage N". The undiffused gas leaving the high-pressure chamber 2", 3" passes through a standard control valve V" and through a compressor B" to the inlet 6" of a lower stage N"−1.

The characteristics of the "jack rabbit" stage may be compared to other stages on the basis of ideal cascades. It is apparent from the figure that the "jack rabbit" is a more efficient but more complex stage than the "badger" in a practical plant with control valves. It is a more efficient but somewhat more complex stage than the "rabbit" in any plant, even when valve losses are not considered. The number of conventional "badger" stages, however, is not reduced, as it is in the case of the system of abandoned application Ser. No. 537,310 of Shacter, filed Sept. 28, 1955. The stage size of the present stage type, however, is substantially smaller than that of the other types. Thus, compared to the system of FIG. 2 herein, and the system of the above application, supra, energy savings are attained and stage size is reduced at the expense of some complexity of stage configuration.

The "jack rabbit" stage of the present application, like the "badger" stage of FIG. 1 herein, and the "mated badger" stage of the above application, supra, can thus form ideal cascades without mixing inefficiencies. Although the "jack rabbit" stage is as efficient as any of the other stages in the use of power and barrier, it differs from the other two complex stages, i.e., the "rabbit" stage of FIG. 2 herein, and the "mated badger" stage of said patent application, supra, in that its two chambers are smaller and house much less barrier area. The "jack rabbit" stage, then, can perform the separation of one "badger" stage, of FIG. 1 herein. It can use the same total barrier area, but in a more complex diffuser. In return for the additional compression, the "jack rabbit" stage can duplicate the separation of the "badger" stage of FIG. 1 herein with substantially half the "badger" intra-stage flow rates.

Having thus described our invention, we claim:

1. A gaseous diffusion system comprising a plurality of diffusers connected in cascade to form a series of stages, each of said diffusers having a porous partition dividing it into a high pressure chamber and a low pressure chamber, and means for combining a portion of the enriched gas from a succeeding stage with a portion of the enriched gas from the low pressure chamber of each stage and feeding it into one extremity of the high pressure chamber thereof.

2. A plural stage gaseous diffusion system comprising a plurality of diffusers, each of said diffusers having a high pressure chamber and a low pressure chamber separated by a porous membrane, and a line for joining the output to the high pressure chamber in each of the stages to an intermediate portion of the high pressure chamber of each preceding stage to permit continuous flow of a feed material.

3. A gaseous diffusion system comprising a series of diffusers connected to form a multi-stage cascade, each of said diffusers having a porous partition dividing it into a high pressure chamber and a low pressure chamber, means for feeding the depleted output from the high pressure chamber of each stage to an intermediate portion of the high pressure chamber of each preceding stage, and means for feeding a portion of the enriched output of each preceding stage to the input of the high pressure chamber thereof for mixing with the feed at the intermediate portion to provide a mixture of substantially uniform enrichment.

4. A gaseous diffusion system comprising a series of diffusers connected to form a multi-stage cascade, each of said diffusers having a porous partition dividing it into a high pressure chamber and a low pressure chamber, means for combining the enriched output from the low pressure chamber of each diffuser with a portion of the output of the low pressure chamber of each preceding diffuser to provide feed for the input at the end of each stage, and means for feeding a portion of the depleted output from the high pressure chamber of the diffuser of each succeeding stage to an intermediate portion of the high pressure chamber of the diffuser of each stage to provide a feed mixture of substantially uniform enrichment.

5. A gaseous diffusion system comprising a plurality of diffusers connected in cascade to form a series of stages, each of said diffusers having a porous partition dividing it into a high pressure chamber and a low pressure chamber, means for dividing the low pressure chamber into a plurality of compartments, a line for feeding depleted gases to the intermediate portion of the high pressure chamber of each stage from each succeeding stage, and means for feeding enriched gases from one of said compartments of each stage to the input of the high pressure chamber of each succeeding stage to provide mixing of gases of like enrichment.

6. A gaseous diffusion system comprising a plurality of diffusers connected in cascade to form a series of stages, each of said diffusers having a porous partition dividing it into a high pressure chamber and a low pressure chamber, means for dividing the low pressure chamber into a plurality of compartments, a line for feeding depleted gases to an intermediate portion of the high pressure chamber of each stage from each succeeding stage, a line for combining the enriched gases from one of said compartments of each stage with those of one of said compartments of each succeeding stage and feeding them into the input at one end of the high pressure chamber of each said succeeding stage to provide for mixing of gases of substantially the same enrichment.

7. A gaseous diffusion system comprising a plurality of diffusers connected in cascade to form a series of stages, each of said diffusers having a porous partition dividing it into a high pressure chamber and a low pressure chamber, said high pressure chamber having an inlet at one end and an outlet at the other end, means for dividing the low pressure chamber into a plurality of compartments, a line for feeding depleted gases to an intermediate portion of the high pressure chamber of each stage from the outlet of the high pressure chamber of each succeeding stage, and a line for feeding enriched gases from one of said compartments adjacent said inlet of each stage to the inlet of the high pressure chamber of each of said succeeding stages for combining gases of like enrichment.

8. A gaseous diffusion system comprising a plurality of diffusers connected in cascade to form a series of stages, each of said diffusers having a porous partition dividing it into a high pressure chamber and a low pressure chamber, partition means for dividing the low pressure chamber into a pair of compartments, an inlet at one extremity of said high pressure chamber adjacent one of said compartments and an outlet at the opposite extremity thereof adjacent the other of said compartments, and means for combining the enriched gas from the other of said compartments of each stage with the enriched gas from the first named compartment of each preceding stage and feeding the combined gases to the inlet of the high pressure chamber of each stage.

9. A gaseous diffusion system comprising a plurality of diffusers connected in cascade to form a series of stages, each of said diffusers having a porous partition dividing it into a high pressure chamber and a low pressure chamber, partition means for dividing the low pressure chamber into a pair of compartments, an inlet at one extremity of said high pressure chamber adjacent one of said compartments and an outlet at the opposite extremity thereof adjacent the other of said compartments, means for combining the enriched gas from the other of said compartments of each stage with the enriched gas from the first named compartment of each preceding stage and feeding the combined gases to the inlet of the high pressure chamber of each stage, and means for feeding the depleted gases from the high pressure chamber of each stage to the intermediate portion of the high pressure chamber of each preceding stage to insure mixing of gases of like enrichment.

* * * * *